May 13, 1969 E. LATTA ET AL 3,444,409
BRUSH ASSEMBLY FOR DYNAMOELECTRIC MACHINE
Filed Nov. 9, 1967
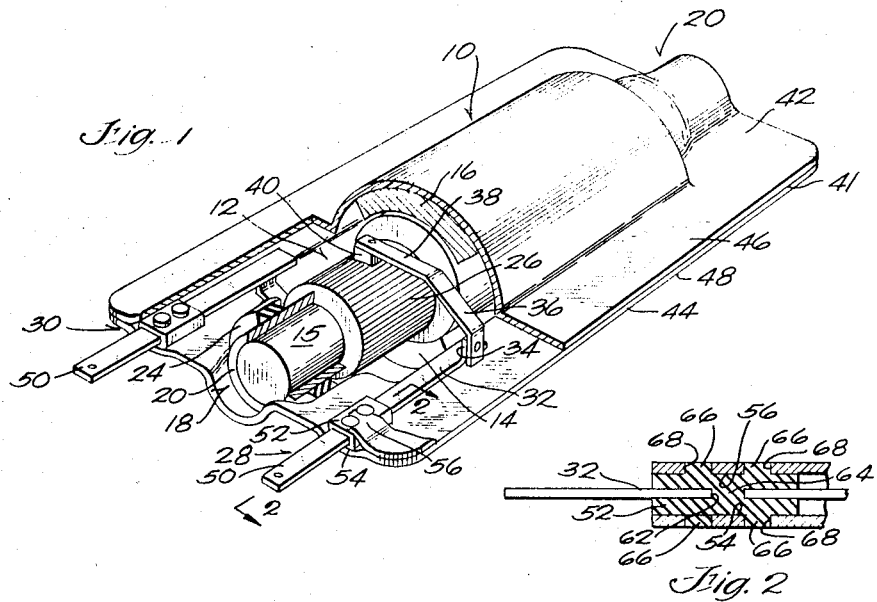
Fig. 1
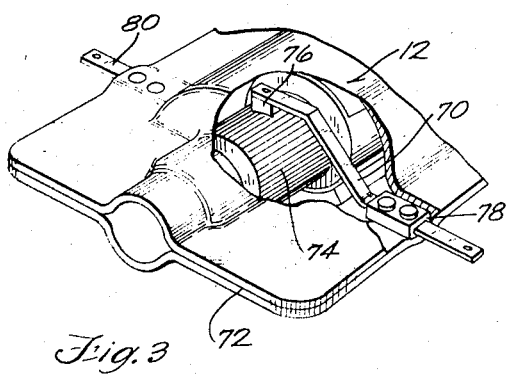
Fig. 2
Fig. 3
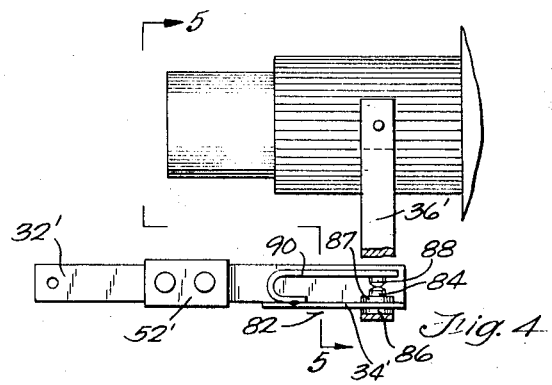
Fig. 4
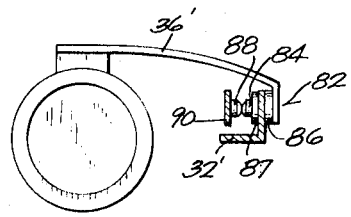
Fig. 5
Inventors
Edward Latta
Edmund J. Godin
Jerome Phillips
By Joseph A. Semignani
Attorney

United States Patent Office 3,444,409
Patented May 13, 1969

3,444,409
BRUSH ASSEMBLY FOR DYNAMOELECTRIC MACHINE
Edward Latta, Owosso, Edmund J. Godin, Detroit, and Jerome Phillips, Owosso, Mich., assignors to Controls Company of America, Melrose Park, Ill., a corporation of Delaware
Filed Nov. 9, 1967, Ser. No. 681,736
Int. Cl. H02k 13/10
U.S. Cl. 310—239                                       12 Claims

ABSTRACT OF THE DISCLOSURE

A brush assembly construction wherein a brush is supported by a spring arm which is attached to or is a part of a relatively rigid arm. The brush assembly is supported within an electric motor housing by clamping the rigid arm in a seam in the housing, the seam being defined by abutting edges of the motor housing sections. The relatively rigid arm is electrically insulated from the housing and has an interlocking engagement with the motor housing at the seam. In a more specific aspect of the disclosure, a circuit breaker is connected between the rigid arm and spring arm to complete an electrical circuit to the motor brush and is operative, in response to a change in a motor condition, to open the motor brush circuit.

BACKGROUND OF THE INVENTION

Field of invention

This invention relates to dynamoelectric machines and, more particularly, to a brush assembly and its connection in the dynamoelectric machine.

Description of prior art

The construction of brush assemblies and their connection in dynamoelectric machinery is a highly developed art. Hence, various proposals have been made in the past as to types of brush assembly construction and arrangements for connecting such assemblies in the machinery. But, for the most part, such prior proposals have been relatively complex and/or have not been suited for automated assembly techniques.

SUMMARY OF INVENTION

In accordance with this inventon, a dynamoelectric machine is provided with a housing having a seam defined between first and second housing portions. A brush assembly, which cooperates in providing the electrical connection to the commutator of the rotating portion of the machine, includes a brush engaging the commutator and a support for the brush which is made up of a first relatively rigid portion extending through the housing seam and a second generally resilient portion carrying the brush and providing a biasing force urging the brush into engagement with the commutator. The rigid portion of the support is fixed in the seam between the housing portions to hold the brush assembly in the dynamoelectric machine.

In accordance with a more specific aspect of this invention a circuit breaker is also provided in the brush assembly. The circuit breaker is connected between the rigid portion, which extends through the motor housing to provide an electrical terminal, and the resilient portion carrying the brush. The circuit breaker responds to a motor condition and selectively completes and interrupts the circuit to the commutator on the basis of that condition.

DESCRIPTION OF DRAWINGS

FIG. 1 is a perspective of an electric motor incorporating this invention and having portions of the housing broken away to expose the interior motor structure;

FIG. 2 is a section view taken along line 2—2 of FIG. 1;

FIG. 3 is a partial view of an electric motor illustrating an alternative construction;

FIG. 4 is a side elevation of a part of an electric motor illustrating another alternative;

FIG. 5 is a view taken along line 5—5 of FIG. 4.

DESCRIPTION OF PREFERRED EMBODIMENT

With particular reference to the drawings, the illustrated type of dynamoelectric machinery is an electrical motor which can be, for example, a fractional horsepower permanent magnet motor. The motor includes an armature assembly 12 within housing 10. A field generating assembly is disposed within the housing and can take the form of permanent magnet members 14 and 16 suitably attached to the interior of the housing and magnetized in a conventional manner to generate the motor field. Armature shaft 15 extends from both axial ends of the armature assembly. The shaft ends are engaged, by means of suitable bearing assemblies, in identical areas 18 and 20 formed in the housing. For example, the bearing assembly can take the form of that disclosed and claimed in the copending application of Edward Latta, Ser. No. 658,161, filed Aug. 3, 1969, entitled, "Motor Armature Bearing Assembly," and assigned to the assignee of this application. Briefly, bushing 22 on each shaft end is held in place in areas 18 and 20 by a resilient sleeve 24 which is clamped between the bushings and the inner walls of areas 18 and 20. The bearing arrangements are identical so only one has been described.

The armature assembly also includes a commutator 26 and the general practice is to establish an electrical connection to the armature through brushes and the commutator. The commutator is of conventional construction and will not be described. The construction of the brush assemblies and their general arrangement within a motor housing are well-known but, for the most part, prior constructions and arrangements have not been particularly well suited to automated assembly techniques. This invention is concerned with the simplification of the brush assembly and the provision of a brush assembly and a particular attachment thereof in the motor structure which is well suited to automated assembly.

Brush assemblies 28 and 30 are identical in construction and in arrangement in the motor housing and, therefore, only one will be described. Brush assembly 28 includes plate 32 having an integral tab 34. The plate can be a stamping with tab 34 being integrally formed and bent to the desired angle. Spring brush arm 36 is riveted, or otherwise suitably electrically connected, to the tab and its free end 38 carries brush 40. The brush is of conventional conductive material such as carbon. Plate 32 is relatively rigid whereas spring arm 36 is made of a suitable spring material to exhibit desired resilient characteristics, for example the spring arm can be made of phosphorous bronze or beryllium copper. In engaging the commutator, the spring arm 36 is distorted from its normal position so that an inherent bias is provided urging the brush 40 into engagement with the commutator or back toward its normal position. The spring arm reacts against plate 32 in providing the biasing force.

The connection of the brushes in the motor is accomplished simply and effectively by clamping arm 50 of plate 32 in a seam 41 between two sections of the motor housing. As illustrated in FIGS. 1 and 2, the housing is made up of two half-sections 42 and 44 and the seam is defined at the joint between the two sections. The half-sections are identical and complementary so that, when joined, they complete the outer housing. Engagement between the housing sections is made through marginal flanges 46 and 48, the actual connection can be made by any means, for example a conventional turned tab arrangement (not shown) or a more permanent connection can be made using a suitable adhesive (not shown). Plate 32 is positioned at the seam with a portion of the plate disposed within the housing and with its arm 50 extending through the seam exteriorly of the housing. The exposed end of arm 50 provides an electrical terminal for suitable connection to an electrical source.

Insulator 52 surrounds plate arm 50 to electrically insulate the plate from the metallic housing, the insulator can be made of any suitable electrical insulating material. Flanges 46 and 48 include opposed upsets 54 and 56 so that brush assembly plate 32 is accommodated at the seam without interfering with a tight seal at the joint between housing sections. The engagement between the edges of the upset portions and the insulator serve to hold the plate against movement along the seam. This also positions the overall brush assembly. In order to further insure against movement of the brush assembly with respect to the motor housing, or specifically with respect to the commutator, an interengaging connection between the insulator and the housing and between the insulator and plate 32 is provided. More specifically, plate arm 50 includes an aperture 62 and a portion 64 of the insulator extends through aperture 62 to lock the insulator in place on the plate. The insulator is also provided with pairs of projections 66 on the opposite faces thereof, these projections fitting into pairs of aperture 68 in both flanges 46 and 48 to thereby prevent longitudinal movement of plate 32 with respect to the insulator and also preventing longitudinal movement of the insulator-plate assembly with respect to the seam. It will be appreciated that insulator 52 can be molded onto plate 32 with projections 66 and then assembled, as will be described more completely hereinafter, into the motor housing with the projections being engaged in apertures 68. Alternatively, the plate can be inserted between upsets 54 and 56 and held in place by a suitable fixture while the insulator is molded in place in the seam. Also the insulator could be provided in two pieces adapted to be assembled on the rigid plate and engage the plate and housing sections in the manner described. However, the first mentioned method is preferred as it facilitates assembly.

The brush assembly is thus held in position with respect to the housing and with brush 40 engaging the commutator. Plate 32 and spring arm 36 are of electrically conductive material. The outer end of plate arm 50 provides a point of connection for electrical leads with the electrical circuit from the leads to the commutator being completed through conductive plate 32, the electrical connection between that plate and spring arm 36 and through the spring arm to the brush.

Although disclosed in connection with a unit motor assembly, it will be appreciated that this invention can be used in a gang motor assembly such as that described and claimed in the copending application of Thomas W. Stone and Edward Latta, Ser. No. 568,200, filed July 27, 1966, entitled, "Motor and Method of Assembling Same," and assigned to the assignee of this application.

Furthermore, the brush assembly need not extend through the axial end of the motor but can be brought out of the motor in the seam along the motor side. FIG. 3 illustrates this alternative embodiment and a further simplification which can be achieved in the brush assembly with this invention is also illustrated in FIG. 3. In this embodiment, the rigid plate and resilient spring arm are combined in a one piece member 70. Member 70 is made of resilient material such as the phosphorous bronze or beryllium copper mentioned above in connection with spring arm 36. Member 70 is held in place in seam 72 in the identical manner described in connection with the embodiment of FIGS. 1 and 2. The seam is formed by abutting flanges on the marginal edges of identical motor half-sections. The seam is generally aligned with the axis of the armature and member 70 extends from the seam up and over commutator 74 to support brush 76 in engagement with the upper side of the commutator. It will be appreciated that the reference to the upper side, etc., is with reference to the drawings and is not necessarily meant as a limitation on the brush assembly arrangement. With this orientation of member 70 in the motor, the member is distorted from a normal position between its point of engagement in seam 72 and brush 76 to thereby create an inherent biasing force in the member back toward its normal position which urges brush 76 into engagement with the commutator. Thus, as in FIGS. 1 and 2, the spring arm biases the brush into engagement with the commutator except that in this instance the distorted portion of member 70, in providing the biasing force, reacts against an integral portion of member 70 which is held in the seam. Again, an insulator 78 electrically insulates member 70 from the housing and the same arrangement of engaging projections and apertures is provided between the insulator, member 70 and the flanges of the housing section halves to hold the brush assembly against movement in the seam with respect to the commutator. Brush assembly 80 is identical in construction to that which has already been described so that the single description will suffice for both.

As was stated previously, this brush construction lends itself particularly well to automated assembly techniques. More specifically the motor section halves can be performed with the marginal flanges and properly positioned upsets. The brush assembly is then provided with a molded-in-place insulator (52 or 78) and the brush assembly, with insulator, is properly positioned in one section half with the brush engaging the commutator, the armature assembly having previously been positioned in that section half. The other section half is then moved into place and connected to the lower section half to complete the motor assembly and simultaneously lock the brush assembly in place.

A further variation of this invention is illustrated in FIGS. 4 and 5. In this variation the brush assembly includes a relatively rigid plate 32' and a resilient arm 36', again both of electrically conductive material. The plate is provided with insulator 52' and the brush assembly is connected in a motor housing in a manner identical to that described in connection with the embodiment of FIGS. 1 and 2. In this embodiment, the electrical connection between plate 32' and spring arm 36' is made through a circuit breaker assembly 82. Structurally the circuit breaker includes stationary contact 84 having a riveted connection to spring arm 36' and on tab 34' of plate 32'. Electrical insulating spacers 86 and 87 electrically insulate the contact from tab 34'. Movable contact 88 is supported on blade 90, and blade 90 is electrically connected to plate 32' and supports contact 88 in opposed relation to fixed contact 84. Preferably, arm 88 is a bimetal which is capable of responding to temperature changes. The bimetal is positioned within the housing and will respond to changes in temperature of the housing interior. Normally contacts 86 and 88 are in engagement completing a circuit to the commutator but the circuit breaker will respond to an elevated temperature and open the circuit to the motor to thereby provide thermal protection for the motor. A circuit breaker need only be provided in one motor brush assembly but can be included in both if desired.

It will be noted that the circuit breaker elements are supported wholly within the brush assembly so that the circuit breaker is provided without sacrificing the simplicity afforded by the basic brush assembly.

Although this invention has been illustrated and described in connection with particular embodiments thereof, it will be apparent to those skilled in the art that various changes and modifications may be made therein without departing from the spirit of the invention or from the scope of the appended claims.

We claim:
1. In a dynamoelectric machine the combination of:
   means defining a housing having first and second portions defining a seam therebetween,
   a rotatable assembly within said housing including commutator means,
   a brush assembly including:
      brush means engaging said commutator means,
      and support means for said brush means including a first portion extending through said seam and a second generally resilient portion connected to said brush means and biasing said brush means into engagement with said commutator means.
   and said first portion fixed in said seam to hold said brush assembly in said dynamoelectric machine.
2. The dynamoelectric machine of claim 1 wherein: said second support means portion comprises an extension from said first portion and reacts against said first portion in biasing said brush means into engagement with said commutator means.
3. The dynamoelectric machine of claim 1 wherein: said first support means portion is relatively rigid, and said second support means portion comprises a resilient spring arm attached to said first portion and carrying said brush means in engagement with said commutator means.
4. The dynamoelectric machine of claim 1 wherein: said first and second support means portions are part of a one-piece support member engaged in said seam and carrying said brush means at a point on said support member spaced from said seam,
   and at least a portion of the extension of said support member between said seam and said brush means being distorted to produce the force biasing said brush means into engagement with said commutator means.
5. The dynamoelectric machine of claim 1 wherein: said first and second housing portions comprise housing sections engaged along abutting edges to define the dynamoelectric machine housing with said abutting edges defining said seam,
   and insulating means in said seam electrically insulating said first support means portion from said housing sections.
6. The dynamoelectric machine of claim 5 including means defining an interlocking connection between said insulating means and said first support means portion and between said insulating means and said housing sections to hold said support means and insulating means against movement in said seam and with respect to said commutator means.
7. The dynamoelectric machine of claim 5 wherein said housing sections comprise complementary halves of the housing.
8. The dynamoelectric machine of claim 1 including: circuit breaker means connected between said first and second support means portions and operative to complete an electric circuit to said brush means through said first and second support means and to open said electric circuit in response to a motor condition.
9. The dynamoelectric machine of claim 8 wherein said circuit breaker includes:
   a fixed contact supported from said first support means portion, said fixed contact electrically connected to said second support means portion and electrically insulated from said first support means portion,
   a movable contact electrically connected to said first support means portion,
   and means supporting said movable contact for movement relative to said fixed contact in response to said motor condition.
10. The dynamoelectric machine of claim 9 wherein means supporting said movable contact for movement comprises a bimetal connected to first support means portion and carrying said movable contact.
11. The dynamoelectric machine of claim 5 wherein: said first and second housing sections include opposed upset portions displaced from the general line of said seam,
   and wherein said first support means portion extends between said opposed upset portions and said insulating means is engaged between said first support means portion and upset portions.
12. The dynamoelectric machine of claim 11 wherein said insulating means has a mating aperture and projection connection with said first support means portion and said upset portions.

References Cited

UNITED STATES PATENTS

| 483,545 | 10/1892 | Cutten | 310—71 X |
| 1,157,963 | 10/1915 | Shaw | 310—71 X |
| 2,193,172 | 3/1940 | Hills | 310—238 |
| 2,991,379 | 7/1961 | Van Dam | 310—247 |
| 3,313,964 | 4/1967 | Mattson | 310—239 |

WARREN E. RAY, *Primary Examiner.*

R. SKUDY, *Assistant Examiner.*

U.S. Cl. X.R.

310—68, 71, 89